R. C. BARTLETT.
BUG AND WORM COLLECTOR.
APPLICATION FILED JUNE 17, 1912.
1,060,417.
Patented Apr. 29, 1913.
5 SHEETS—SHEET 1.
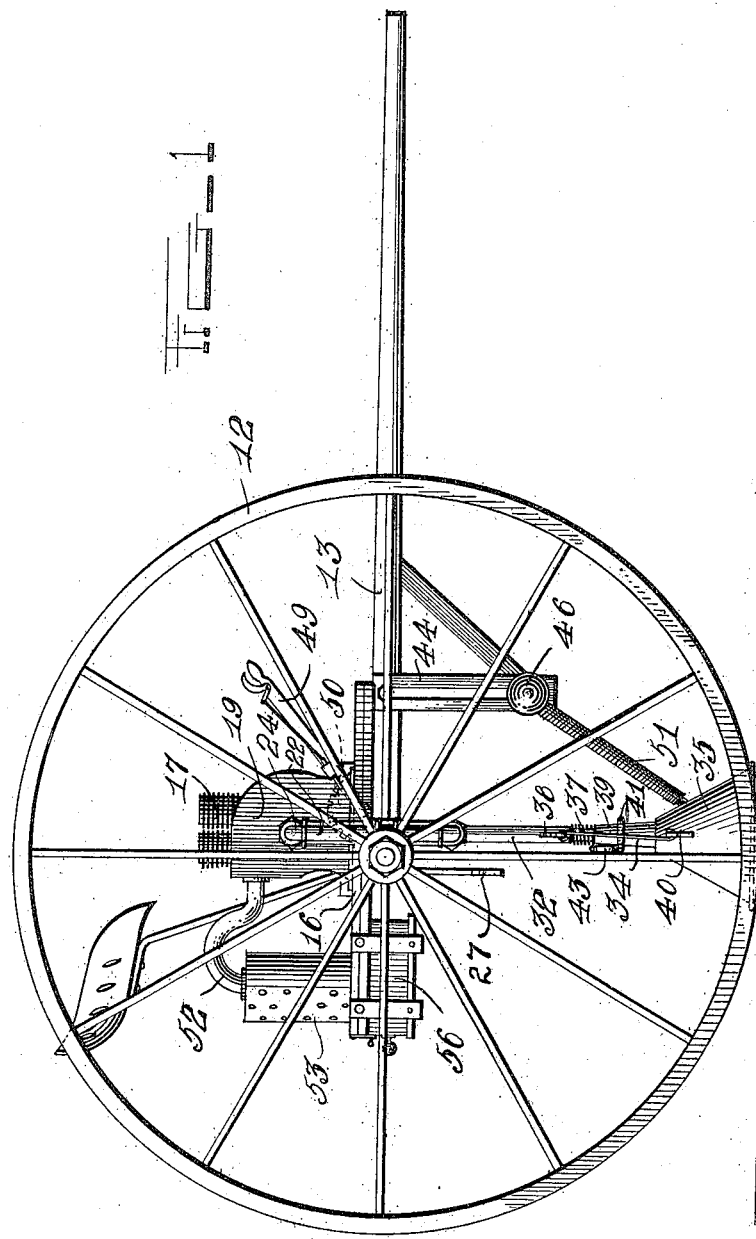
WITNESSES
C. R. Hardy
L. N. Gillis
INVENTOR
Reed C. Bartlett
By E. E. Vrooman, his Attorney R. C. BARTLETT.
BUG AND WORM COLLECTOR.
APPLICATION FILED JUNE 17, 1912.
1,060,417.
Patented Apr. 29, 1913.
5 SHEETS—SHEET 2.
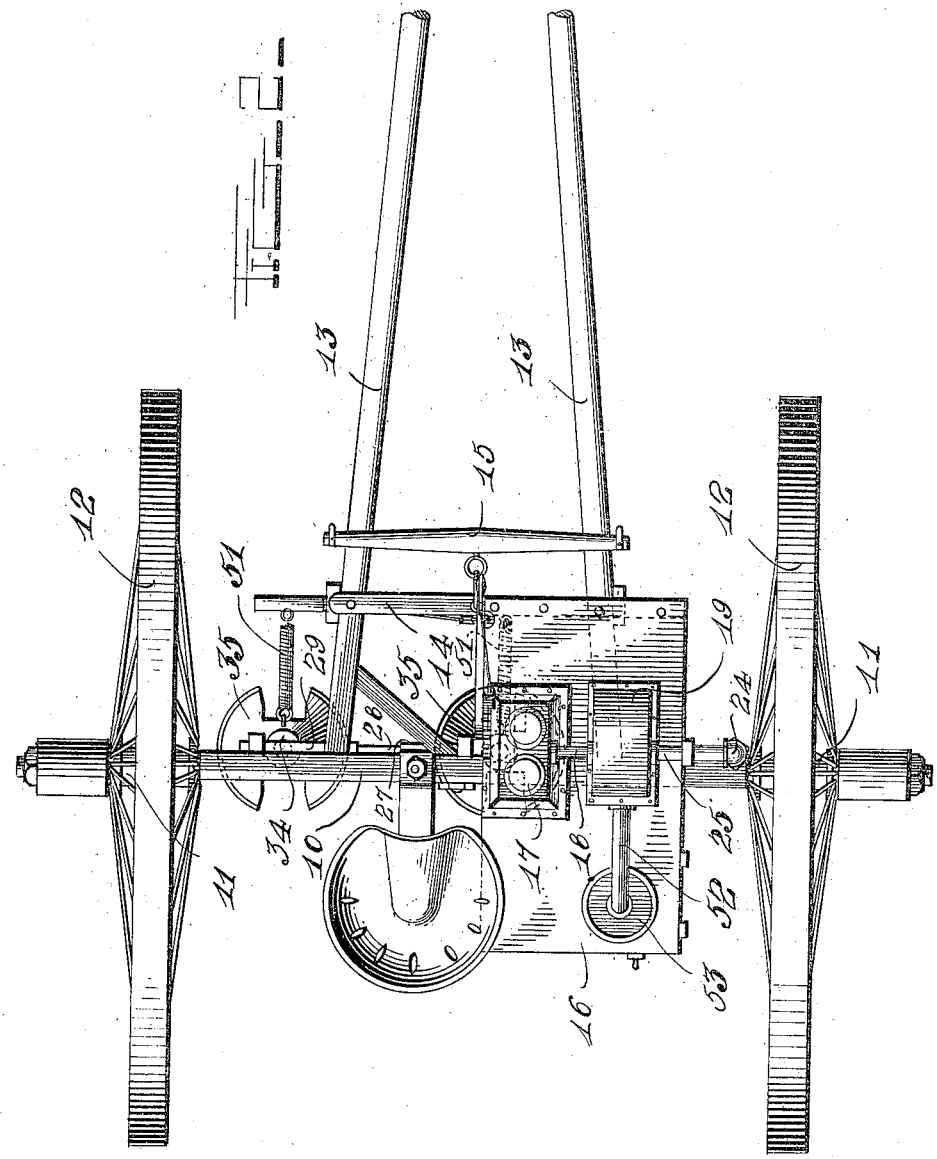
WITNESSES
INVENTOR
Reed C. Bartlett
his Attorney.

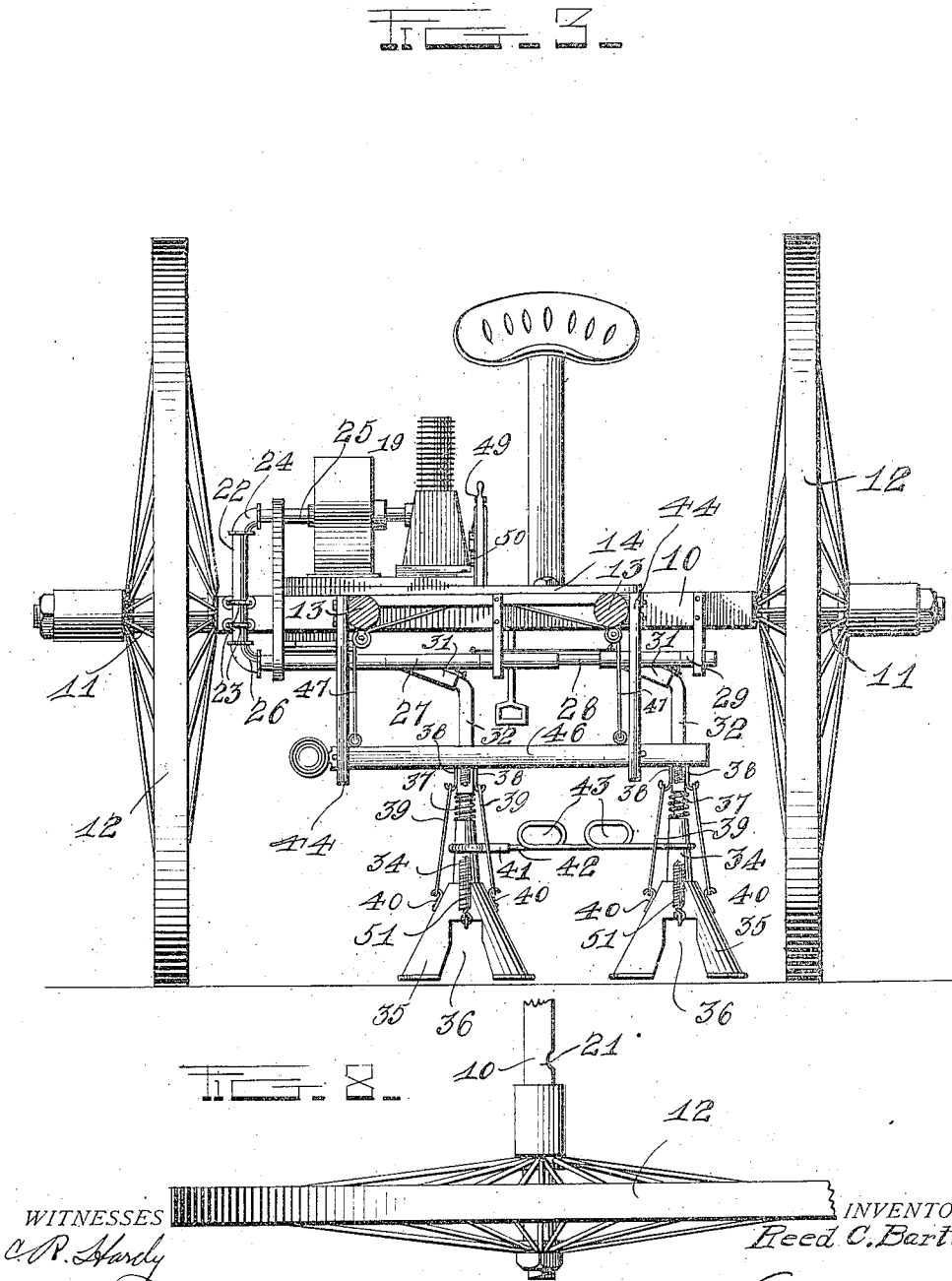

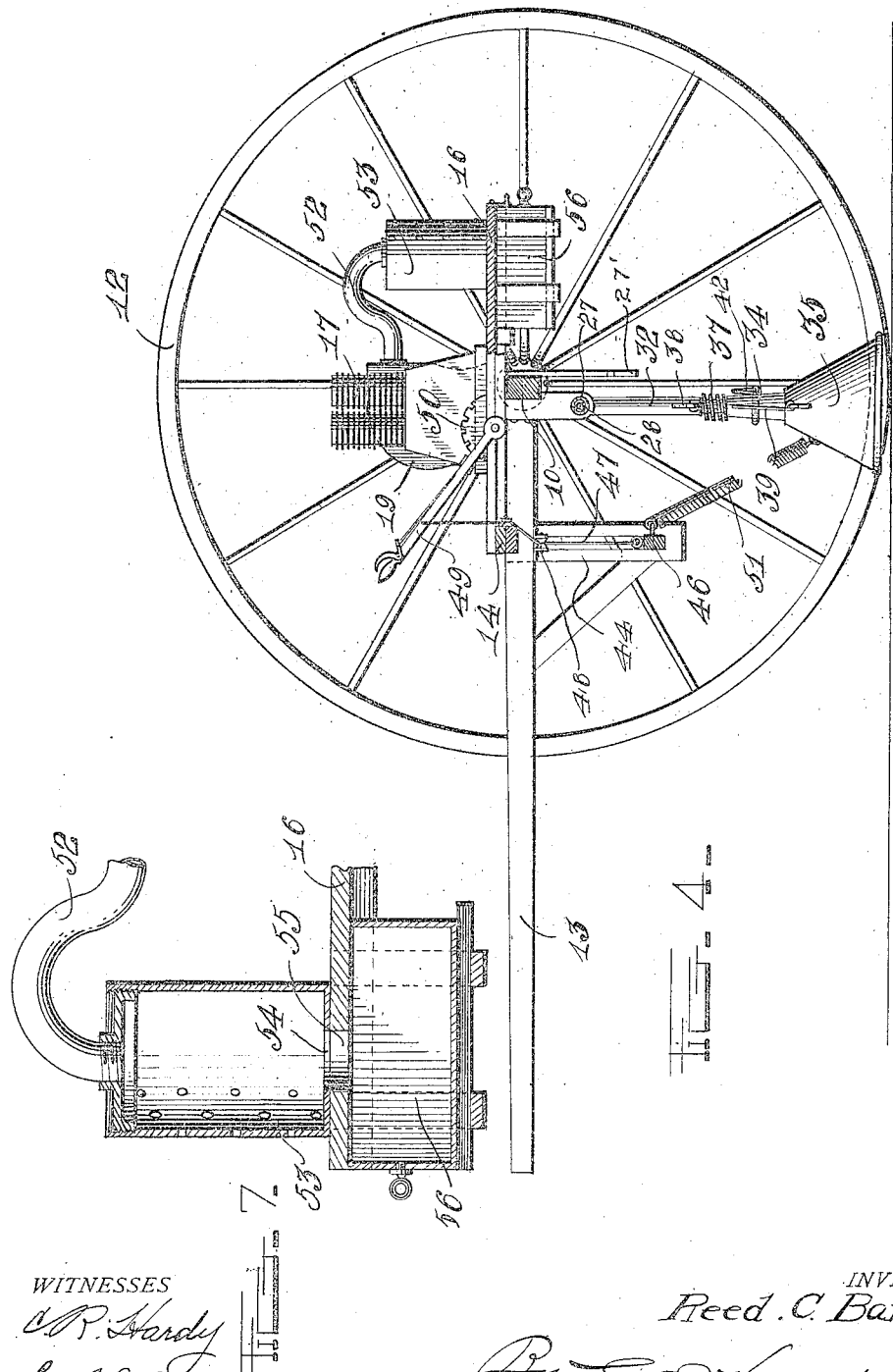

R. C. BARTLETT.
BUG AND WORM COLLECTOR.
APPLICATION FILED JUNE 17, 1912.
1,060,417.
Patented Apr. 29, 1913.
5 SHEETS—SHEET 5.
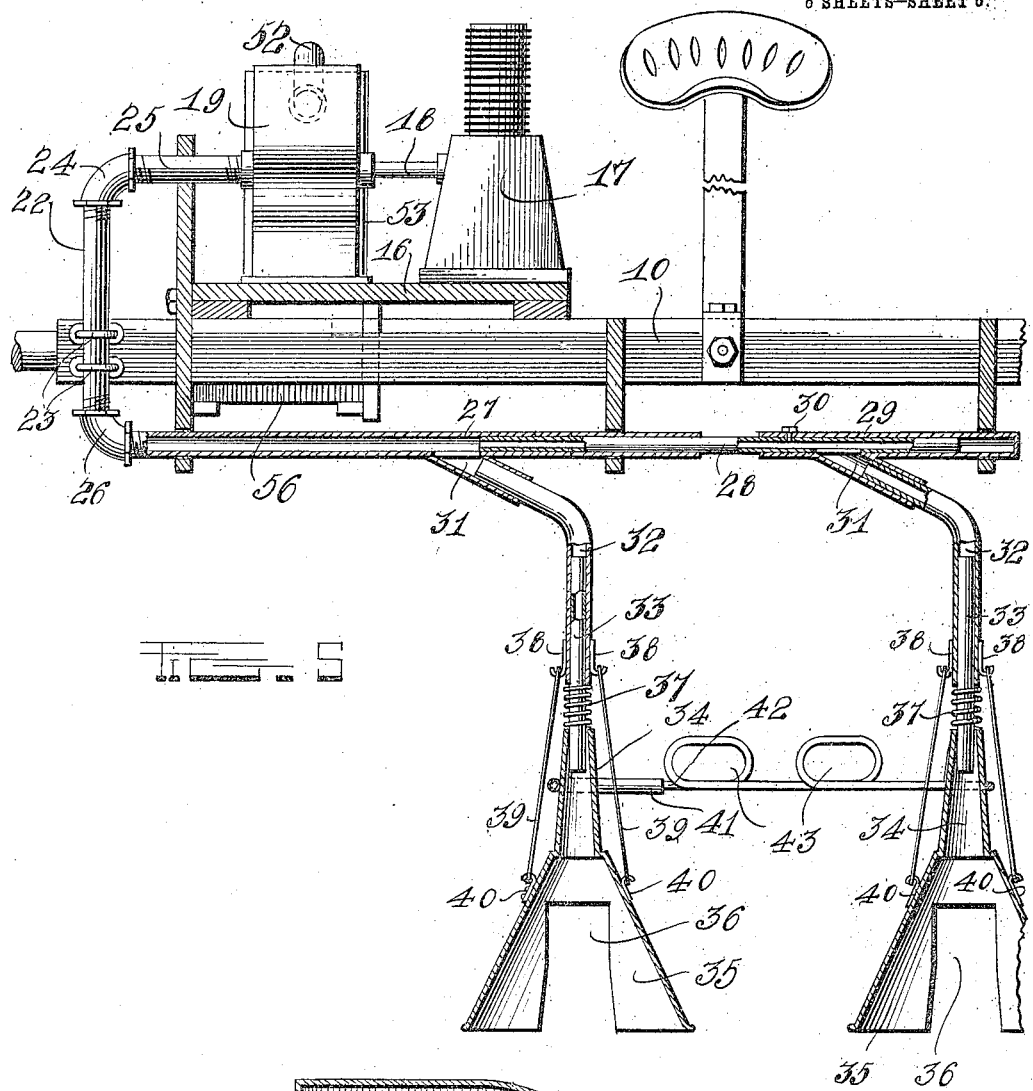
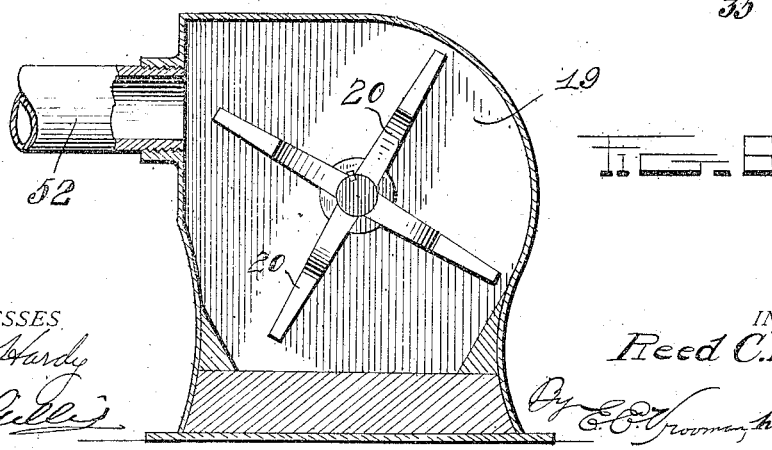
WITNESSES
INVENTOR
Reed C. Bartlett
his Attorney.

UNITED STATES PATENT OFFICE.

REED C. BARTLETT, OF WAUPACA, WISCONSIN.

BUG AND WORM COLLECTOR.

1,060,417.

Specification of Letters Patent.

Patented Apr. 29, 1913.

Application filed June 17, 1912. Serial No. 704,133.

*To all whom it may concern:*

Be it known that I, REED C. BARTLETT, a citizen of the United States, residing at Waupaca, in the county of Waupaca and State of Wisconsin, have invented certain new and useful Improvements in Bug and Worm Collectors, of which the following is a specification, reference being had therein to the accompanying drawing.

This invention relates to agricultural implements and has special reference to a device for collecting bugs and worms.

The principal object of the invention is to improve and simplify the general construction of devices of this character and to enable bugs and worms to be collected by improved pneumatic means.

A second object of the invention is to provide an improved yieldable structure which will prevent injury to plants.

With the above and other objects in view the invention consists in general of certain novel constructions, combinations and arrangements of parts, as will be hereinafter fully described, illustrated in the accompanying drawings, and specifically claimed.

In the accompanying drawings, like characters of reference indicate like parts in the several views, and:—Figure 1 is a side elevation of the device constructed in accordance with this invention. Fig. 2 is a plan view thereof. Fig. 3 is a front elevation thereof. Fig. 4 is a longitudinal median section taken through the device. Fig. 5 is an enlarged detail transverse section. Fig. 6 is a section through a blower used herewith. Fig. 7 is a section through the insect collecting box. Fig. 8 is a detail showing the manner in which the axle is formed for the reception of a certain pipe.

In the construction of this device there is provided an axle 10 whereon are journals 11 carrying ground wheels 12. Extending forwardly from the axle are suitable shafts 13 connected by a cross bar 14 to which is attached a swingle tree 15. Mounted securely upon the axle and cross bar 14 is a platform 16 whereon is located a small engine 17 preferably of the internal combustion type and this engine is provided with a shaft 18 which extends through a fan casing 19 and has mounted thereon within the casing the fan or blower blades 20.

Adjacent one end the axle is provided with a segmento-spherical vertically disposed recess 21 and in this recess there is held a vertical pipe 22, the same being secured by means of suitable clips 23. At the upper end of this pipe there is provided an elbow 24 which is connected by means of a pipe 25 with the center of the fan casing and forms the suction connection therefor.

At the lower end of the pipe 22 there is provided a similar elbow 26 to which is connected a pipe section 27, and slidable in this pipe section is a pipe section 28 on the the outer end whereof is mounted a pipe section 29 which is normally held from movement on the pipe section 28 by means of a screw 30.

Extending downward at an angle to each of these pipe sections 27 and 29 is a pipe section 31 to which is secured an angularly bent pipe section 32. In each of these latter pipe sections there is mounted a pipe section 33 and on the lower ends of the sections 33 are slidably mounted the necks 34 of intake hoods 35, each of which is provided with oppositely disposed slots 36. Between each neck 34 and the respective section 32 is mounted a coil spring 37 which normally urges the hood downward. On each of the sections 32 are hooks 38 which are connected by links 39 preferably of flexible material, with the hooks 40 on the respective hoods.

Surrounding one of the necks 34 is a pipe 41 within one end of which is fitted a bar 42 bent intermediate its ends to form coils 43. The other end of this bar surrounds the remaining neck 34. This permits the necks to slide to and from each other independent of the movement of the pipe 28 within the pipe 27. Furthermore, the springs 37 are so arranged that they yield slightly to the travel of the plant or in case the hood strikes the ground the same is permitted to move upward and thus prevent injury. Depending from the cross bar 14 are hangers 44 each provided with a vertically extending slot 45 and in these hangers is slidably mounted a cross bar 46 to which is attached a flexible strand 47 which is led through guide pulleys 48 to a latch lever 49, retained in place by quadrant 50 carried on the platform 16. From the cross bar 46 to each of the hoods 35 extends a coil spring 51 so that the hoods are yieldably supported in vertical position but may move backward by the rotation of one of the pipes 32 within the angle pipe 31. Furthermore, by raising or lowering the cross bar 46 the tension of the springs may be varied and the angle at which the hoods are held may also be varied. Leading from the blower casing 19 is a goose neck 52 which connects the blower casing with a perforated cylinder 53 located on the platform and provided with an opening 54 in the bottom, the latter registering with an opening 55 in the platform 16. Beneath the platform 16 is mounted a drawer 56 which is arranged for the reception of the insects which have been caught.

In the operation of the device the machine is driven through the field under cultivation in such a manner that the growing plants pass through openings 36 beneath the hood. At the same time, the engine being in operation a strong suction is created in each hood and the insects which may be knocked off by the hood in its passage over the plant as well as those clinging to the plant are drawn up through the tubes and into the fan casing; from thence they are discharged through a goose neck into the perforated cylinder, and from there they are dropped into the drawer 56 which may be removed for the destruction of the insects by fire, boiling water, or the like. At the same time the air passes out through the small perforations in the cylinder 53 so that suction is maintained constantly. By means of the slidable pipes and the rod 42 sliding in the pipe 41 the distance between the hoods 35 may be adjusted to meet the varying conditions of different fields as previously noted; by means of the lever 49 swinging adjustment may be had of the hoods.

There has thus been provided a simple and efficient device of the kind described, and for the purpose specified.

It is obvious that many minor changes may be made in the form and construction of the invention without departing from the material principles, and it is therefore not wished to confine the invention to the exact form herein shown and described, but it is wished to include all such as properly comes within the scope claimed.

A step 27' is suspended from the frame of the collector adjacent the seat to allow the operator of the collector to mount upon the seat.

Having thus described the invention, what is claimed as new, is:—

1. In a device of the class described, a plurality of collector hoods, jointed pipes connected to said hoods and slidable therewith, springs surrounding one of the joints of said pipes and normally urging the hoods downward, links limiting the downward movement of said hoods, suction means connected to said pipes, and a transporting device for said hoods, pipes, and suction means.

2. In a device of the class described, a plurality of collector hoods, jointed pipes connected to said hoods and slidable therewith, springs surrounding one of the joints of said pipes and normally urging the hoods downward, links limiting the downward movement of said hoods, a pipe having slidable joints connecting the pipes from the hoods, a suction fan connected to said last-mentioned pipe, means for operating said suction fan, a receiving cage connected to the outlet of said fan, a platform whereon said fan rests, an axle supporting said platform, and wheels journaled on said axle.

3. In a device of the class described, a plurality of collector hoods, jointed pipes connected to said hoods and slidable therewith, springs surrounding one of the joints of said pipes and normally urging the hoods downward, links limiting the downward movement of said hoods, a pipe having slidable joints connecting the pipes from the hoods, a suction fan connected to said last-mentioned pipe, means for operating said suction fan, a receiving cage connected to the outlet of said fan, a platform whereon said fan rests, an axle supporting said platform, wheels journaled on said axle, downwardly-extending slotted guides at the forward end of said platform, a cross bar slidable in said guides, a latch lever, a quadrant coöperating with the latch lever mounted on said platform, a flexible connection between said latch lever and cross bar, and springs connecting said cross bar with said hoods.

In testimony whereof I hereunto affix my signature in presence of two witnesses.

REED C. BARTLETT.

Witnesses:
 ALFRED JOHNSON,
 S. W. JOHNSON.